United States Patent Office 2,982,008
Patented May 2, 1961

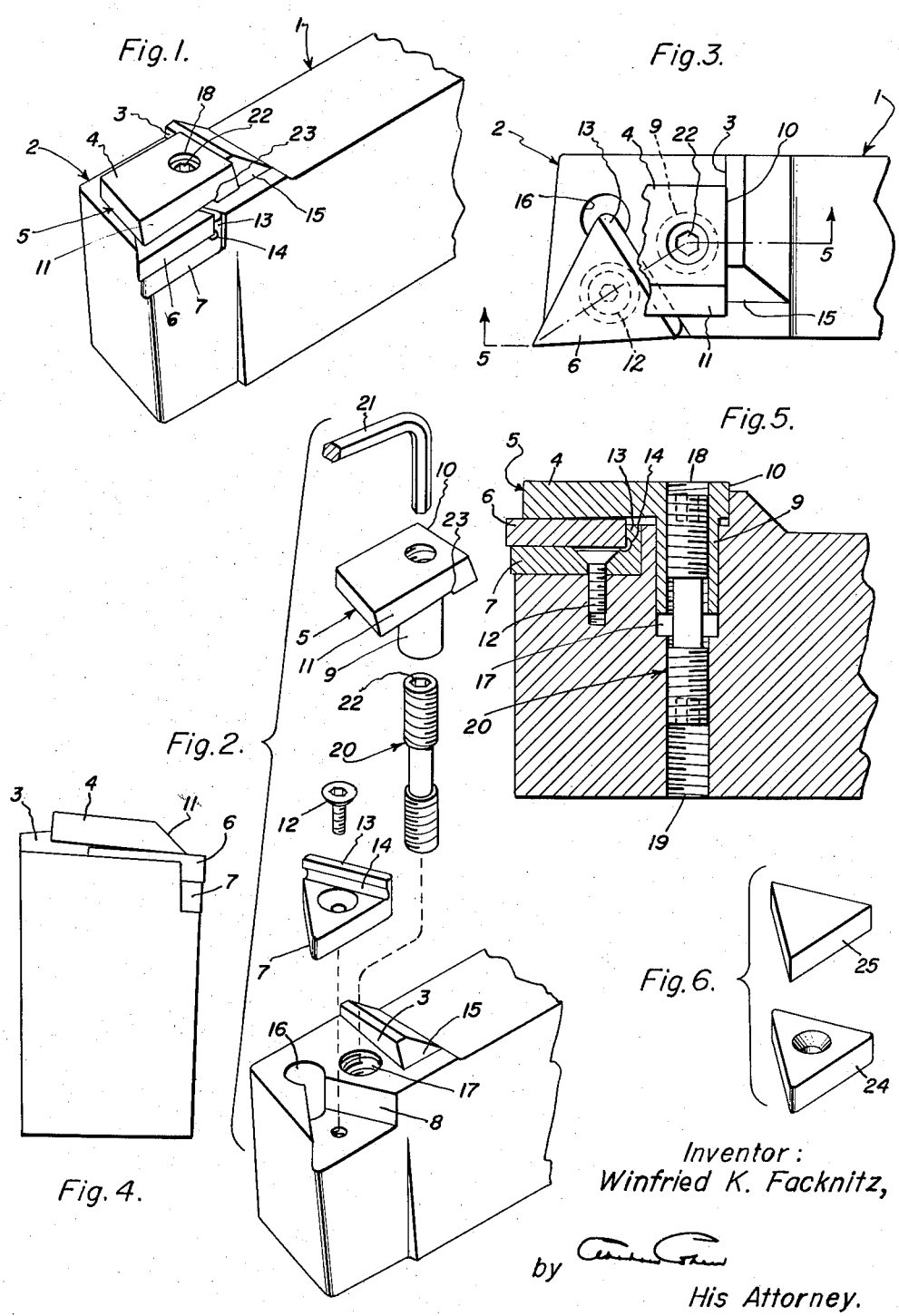

2,982,008
CUTTING TOOL

Winfried K. Facknitz, Farmington, Mich., assignor to General Electric Company, a corporation of New York Filed Apr. 2, 1959, Ser. No. 803,666

1 Claim. (Cl. 29—96)

This invention relates to a cutting tool in which a cutting tool holder releasably holds a removable cutting insert composed of an extremely hard cutting material, such as a cemented carbide or cemented oxide.

In copending application Serial No. 721,232 assigned to the same assignee as the present invention, there is described a cutting tool in which a removable insert is held in place by a self-loosening clamp. The tool holder there described considerably simplifies the removal, replacement or indexing of the cutting insert. It is frequently desirable, however, to use the same tool holder for more than one type of cutting operation in order to avoid change of tool holder and to avoid large tool holder inventories.

A principal object of the present invention is the provision of a seat for cutting inserts in tool holders of the type described in the foregoing copending application which makes the use of the tool holder possible in a greater variety of cutting operations than heretofore possible.

In general, the objects of my invention are achieved by the use of a seat for the cutter insert which makes possible the adaptation of a single cutter tool holder for a variety of sizes of cutter inserts. The cutter bit seat possesses a vertically extending integral lip or rim along its inner surface. When the seat is held in the cutter bit, the vertically extending rim is positioned between the cutter insert and the forward wall of a recess in the cutting tool holder. The cutter seat itself is releasably held in the cutter tool holder so that by simply removing the cutter seat, a change to a smaller or larger cutting insert is possible. The present invention permits the use of the smallest practical size cutting insert for a specific cutting operation. It is no longer necessary, as is the case with prior cutting tools adaptable for only a single size insert, to use a larger size insert than necessary for a particular cutting operation. Moreover, in addition it is no longer necessary to change tool holders when going from a roughing to a finishing operation. An additional advantage of the present invention resides in the fact that the cutter bit seats may be used with tool holders of the type described in the above referred to copending application Serial No. 721,232. Full advantage can therefore be taken of the present improvement without change of cutting tool holder.

The invention will be more clearly understood from the following description taken in conjunction with the accompanying drawing in which:

Fig. 1 is a perspective view, partially cut away, of one embodiment of the cutting tool of the present invention.

Fig. 2 is an exploded view of the embodiment shown in Fig. 1, with the cutting insert removed.

Fig. 3 is a plan view of the embodiment shown in Fig. 1 with the clamp partially cut away.

Fig. 4 is a front elevation of the embodiment shown in Fig. 1.

Fig. 5 is a cross-sectional view taken along the lines 5—5 of Fig. 3, and

Fig. 6 shows a conventional cutter seat and cutting insert.

As can be seen from Fig. 1, the assembled cutting tool of the present invention comprises a shank portion 1, a head portion 2, and a vertical shoulder 3 defining the rear surface of the head portion. For purposes of clarity of description in the specification and claims, head portion 2 will be considered the forward portion of the cutting tool, shank portion 1 the rear portion, the longitudinal axis of the cutting tool as horizontal, and the upright position as that shown in Fig. 1 with the vertical shoulder projecting upward. The horizontal clamp head 4 of the cutter bit clamp 5 firmly retains the cutting insert or cutter bit 6. Cutter bit 6 is releasably held so that its cutting surface is exposed on the open outside of a recess 8 (Fig. 2). A cutter bit seat 7 is positioned on the bottom of the recess 8 beneath cutter bit 6.

Figs. 2, 3, 4 and 5 show in greater detail the construction and relationship of the various parts of the cutting tool holder shown in perspective in Fig. 1. Clamp 5 comprises horizontal clamp head 4 and an integral downward projecting shank or stem 9. The rear face 10 of clamp head 4 is adapted for alignment with the forward wall of vertical shoulder 3, thus providing both for positioning of the clamp and proper transmittal of the cutting thrust to the shank. Tapered face 11 of clamp head 4 is protected from wear caused by chips by the provision of a cemented carbide surface on face 11 of the clamp. Entire clamp head 4 may be composed of cemented carbide, or tapered face 11 may be surfaced with a cemented carbide. Face 11 is also used as a chip breaker to control the length of chips in order to promote their ease of handling and disposal. Head portion 2 of the cutting tool holder contains recess 8 for insertion of cutter bit 6 and cutter bit seat 7. Cutter bit seat 7 may be composed of any hard metallic substance, such as cemented carbide, capable of withstanding deformation at high temperature. Cutter bit seat 7 is held in place by a screw member 12 centered in bit seat 7 for retaining the bit seat in position when changing or rotating the cutter bit.

As can be seen most clearly from Fig. 2, cutter seat 7 contains an upwardly projecting vertical rim or flange 13 integral with the cutter seat 7. When assembled, rim 13 abuts the rear wall of recess 8. The thickness of rim 13 will depend upon the dimensions of cutter bit 6. Rim 13 will be of smaller thickness with a larger insert and larger thickness with a smaller insert. Groove 14 in cutter seat 7 is desirable to assure accurate alignment between cutter insert 6 and the horizontal and vertical abutting surfaces of cutter seat 7.

As can be seen in Figs. 1, 2 and 3, shoulder 3 is cut away at 15 to provide a smooth unobstructed chip flow, the latter being particularly advantageous in the case of light cuts. A groove or channel 16 at the rear of recess 8 is provided which permits accurate alignment of bit 6 without damage to the inner corner of the bit. Aperture 17 is provided in the head portion 2 of the cutting tool holder. This aperture is unthreaded and counterbored to a depth slightly greater than the length of stem 9 of clamp 5. Aperture 17 is threaded in a first direction in its smaller diameter below the counterbore, on its interior surface. Clamp 5 contains an aperture 18 which is threaded in a direction opposite that of aperture 17. Aperture 17 extends vertically through the lower surface of the head portion 2 to form an opening 19 on the lower surface of the head portion of the cutting tool holder. Stem 9 of cutter bit clamp 5 is received by the upper opening of aperture 17. Differential set screw 20 is threaded in a first direction in its lower portion, and in a second direction in its upper portion. The upper portion of differential set screw 20 is adapted for threading engagement with the threaded aperture 18 of clamp 5. The lower portion of differential set screw 20 is adapted for threaded engagement with the threads of aperture 17.

Cutter bit 6 is tightened into position in the cutting tool holder or removed from the cutting tool holder by loosening set screw 20. Thus, by inserting a hexagonal wrench 21 in the hexagonal opening 22 at the top of the differential set screw, clamp 5 is simultaneously loosened and lifted in aperture 17. In effect, as the differential set screw is loosened, the cutter bit is released from its position in the cutting tool holder, and at the same time the differential set screw acts as a jack to lift the clamp from the surface of the cutter bit. Conversely, when the differential set screw is tightened, the tightening of the differential set screw simultaneously acts to lower clamp head 4 into position to retain the cutter bit while the cutter bit is locked in place. At the same time, vertical shoulder 3 serves to align the clamp head in position. Thus, a single tightening of the differential set screw acts simultaneously to align the clamp, tighten the cutter bit, and lower the horizontal clamp surface into position. It should be noted, as can be most clearly seen from Fig. 4, that clamp head 4 is at a very small acute angle of one or two degrees or even less from the horizontal transverse axis of the cutting tool holder. Clamp head 4 is at a similar small acute angle from the horizontal longitudinal axis. As can be seen most clearly from Fig. 1, clamp head 4 possesses a very small acute angle beginning at 23 and extending to the forward extremity of the clamp head. The purpose of this is to assure a firm grip on the cutter bit at the outer extremity of the cutting edge. It should also be noted, as shown by Fig. 5, that the differential set screw is accessible from both the top and the bottom of the cutting tool. Thus, if the cutting tool is installed with its upper surface facing down or on its side, the set screw is still accessible for removal, rotation or replacement of the cutter bit.

If it is necessary to perform a heavier cutting or machining operation, the cutter bit and cutter bit seat shown in Fig. 6 may be used to replace the cutter bit and cutter seat shown in the remaining figures of the drawing by simply loosening set screw 12, attaching larger cutter bit seat 24 and larger insert 25. From the foregoing, it will be apparent that the single tool holder illustrated in the drawing may be used to retain a variety of sizes of cutting inserts and may therefore in turn perform a variety of types of cutting operations.

What I claim as new and desire to secure by Letters Patent of the United States is:

A cutting tool comprising a head portion and a vertical shoulder defining the rear upper surface of the head portion, a cutter bit clamp having a horizontal clamp head, a downward projecting stem and a vertical threaded aperture extending through said clamp, the clamp head of the cutter bit clamp having a rear vertical surface adapted for alignment with said vertical shoulder, said head portion containing a triangular recess and an aperture offset from said recess, said aperture threaded in an opposite direction from said cutter bit clamp aperture, said aperture in the head portion extending vertically through the lower surface of the head portion and adapted to receive in its upper opening the stem of the cutter bit clamp, a single differential set screw adapted for threaded engagement with the threaded aperture of both the head portion and the cutter bit clamp, a horizontally positioned triangular cutter bit releasably held in the recess in the head portion by said clamp and differential set screw so that its cutting surface is exposed on the open outside of the recess, and a horizontally positioned triangular cutter bit seat positioned in said recess below said cutter bit, said cutter bit seat having a vertically and upwardly extending rim along the inner surface of the recess and in abutting relation with both the inner surface of the cutter bit and the recess.

References Cited in the file of this patent

UNITED STATES PATENTS

| | | |
|---|---|---|
| 2,181,023 | Moore | Nov. 21, 1939 |
| 2,296,597 | Carr | Sept. 22, 1942 |
| 2,332,449 | Kousehpil | Oct. 19, 1943 |
| 2,645,844 | Longe | July 21, 1953 |
| 2,787,823 | Kennicott | Apr. 9, 1957 |
| 2,808,637 | Hudson | Oct. 8, 1957 |
| 2,831,241 | Bader | Apr. 22, 1958 |
| 2,848,789 | Friedline | Aug. 26, 1958 |
| 2,865,084 | Wendt | Dec. 23, 1958 |
| 2,887,760 | Armstrong | May 26, 1959 |

FOREIGN PATENTS

| | | |
|---|---|---|
| 215,113 | Australia | Apr. 1, 1958 |